Jan. 16, 1968     A. W. CURTIS     3,363,662

GAS FIRED INFRARED RAY GENERATOR

Original Filed July 29, 1965     3 Sheets-Sheet 1

INVENTOR.
ALLEN W. CURTIS
BY
*J. D. Douglas*
ATTORNEY

Jan. 16, 1968  A. W. CURTIS  3,363,662
GAS FIRED INFRARED RAY GENERATOR
Original Filed July 29, 1965  3 Sheets-Sheet 2
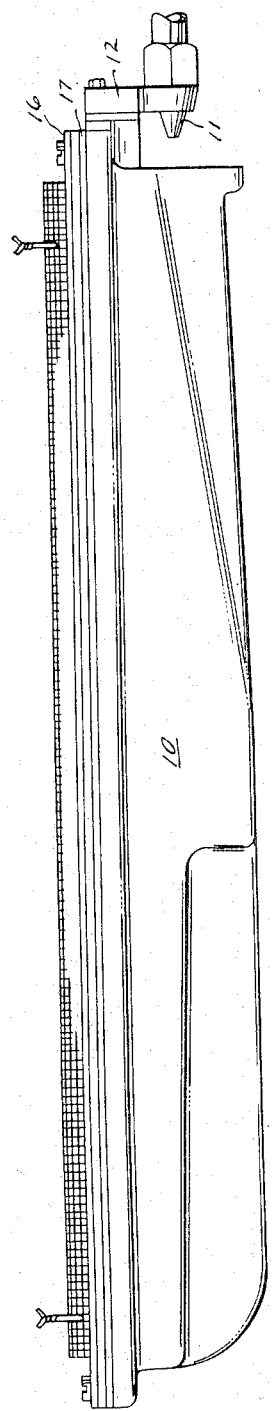
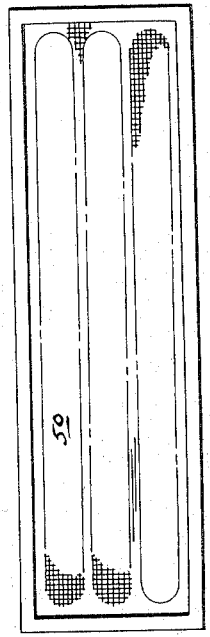
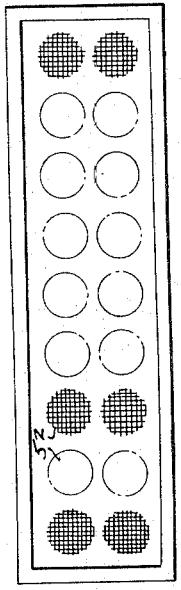
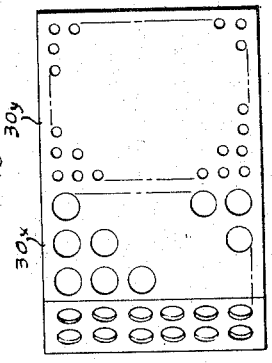
INVENTOR.
ALLEN W. CURTIS
BY
*J. D. Douglas*
ATTORNEY Jan. 16, 1968 A. W. CURTIS 3,363,662
GAS FIRED INFRARED RAY GENERATOR
Original Filed July 29, 1965 3 Sheets-Sheet 3
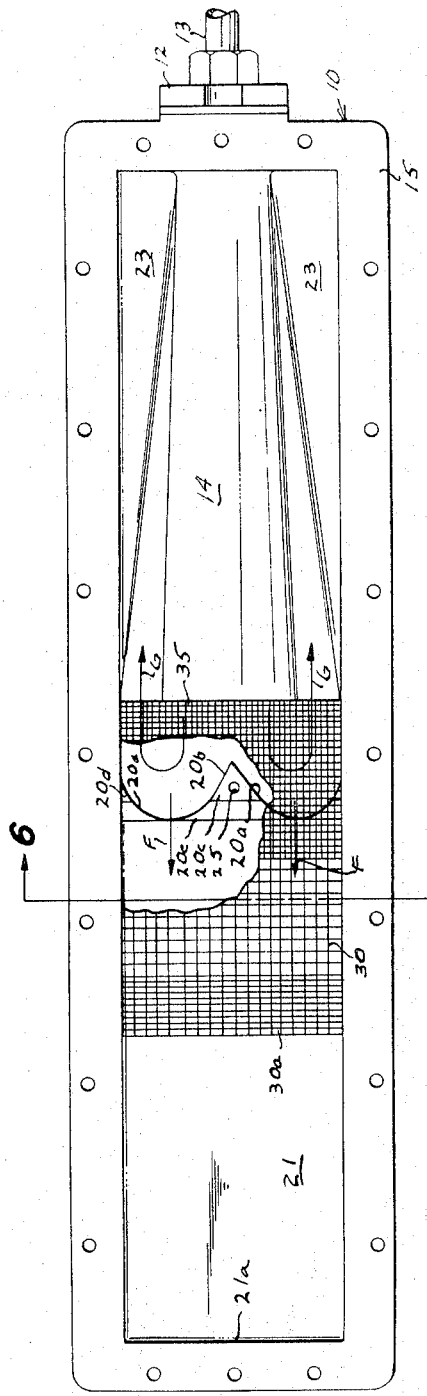
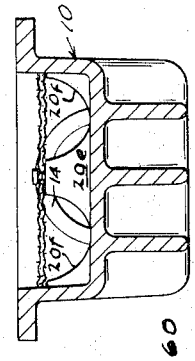
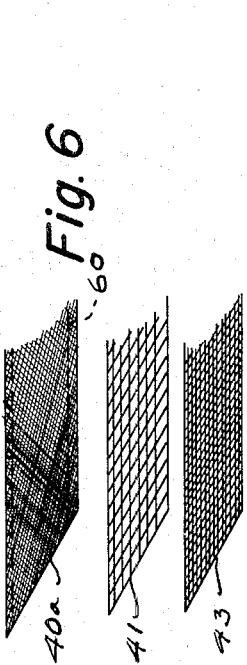
INVENTOR.
ALLEN W. CURTIS
BY
*J. D. Douglas*
ATTORNEY United States Patent Office 3,363,662
Patented Jan. 16, 1968

3,363,662
GAS FIRED INFRARED RAY GENERATOR
Allen W. Curtis, Berea, Ohio
(172 Dennis Drive, Williamsburg, Va. 23185)
Continuation of application Ser. No. 475,744, July 29,
1965. This application May 31, 1966, Ser. No. 560,042
11 Claims. (Cl. 158—114)

ABSTRACT OF THE DISCLOSURE

A gas fired infrared ray generator having a plenum chamber divided into two portions. A venturi tube extends into the first portion and directs gas against a pair of curved end surfaces formed in a wall which end surfaces return a portion of the gas to the first plenum chamber for burning. The curved surfaces intersect the opposite side of the wall and form passages into the second portion of the plenum chamber. A burner assembly covers the open side of the plenum chamber and includes a spreader screen of coarse mesh, a safety screen of fine mesh on one side of the spreader screen and a burner screen of fine mesh on the other side of the spreader screen. The screen assembly is embossed to provide a plurality of ridges and the strands of the safety screen extend at 45° and 135° angles to the other screens.

---

This is a continuation of application Ser. No. 475,744, filed July 29, 1965, now abandoned which is a continuation-in-part of application Ser. No. 264,503, filed Mar. 12, 1963, which is a continuation-in-part of application Ser. No. 785,105, filed Dec. 30, 1958 (now Patent No. 3,084,736).

This invention relates to improvements in infrared ray generators and more particularly to an improvement in an infrared burner of the type illustrated in Patent No. 3,084,736.

Infrared generators or burners are particularly useful where radiant heating is desired. The actual radiator may comprise a surface operating in a temperature range from 900° F. (Black) to 1800° F. (Yellow), the lower temperature being the most efficient radiator. The heating of the radiating surface may be effected in many ways such as by electrical resistance or by the combustion products from gaseous or liquid fired burners. The present invention has to do with burners which are heated by the combustion of a gas or vaporized liquid.

The more common of such burners include a plenum chamber having an open side in or on which is disposed a burner surface where the combustion occurs. In the particular type of burner or generator under consideration the burner surface comprises a pair of fine mesh screens separated by a coarse mesh screen. The fine mesh screens are in contact with the coarse screen on opposite sides and the three screens are held together by one of the fine screens being crimped around the edges of the other screens. The coarse mesh screen acts as a separator and a stretcher for the fine mesh screens. The screens are supported by a frame in such a manner that the screens may expand and contract freely. The frame with the screens is installed as a unit as the burner opening, all as clearly set forth in the aforesaid patent.

In addition to the burner screen element so formed, there is disposed above and spaced parallel to the burner screen a coarse mesh screen which is referred to as a reverberator screen.

The function of the burner screen is to provide a multitude of small, closely spaced jets which provide a blanket of flame on the outer surface thereof. The function of the reverberator screen is to reflect back to the burner screen the heat from the blanket of flame which increases the heat of the outer surface of the burner screen. The heat rays so generated may radiate through the openings in the reverberator screen and pass on to the object or area which is to be heated.

Such devices are frequently used spaced above the floor and the heat is radiated downward toward the object or area, which object or area is heated by the absorption of the rays. The intervening air space is not actually heated and the loss of heat, therefore, is very small.

In such a generator the principal factor which determines the quantity of rays generated is the surface area of the generator which is heated. This is usually determined by the actual square inches of generator surface as defined by the perimeter of the heated surface. Ordinarily if more heat is desired, the entire burner must be enlarged or more than one burner may be used. Although some increase in output can be obtained by increasing the B.t.u. input, the result is to increase the temperature of the generator surface and this results in the generation of light waves which are not efficient heat waves.

Another problem associated with such generators is that of creating an even distribution of gases inside the plenum chamber so that the pressure of the gas in the chamber is uniform over the entire inner surface to provide a flame blanket on the exit side which is without hot spots or unduly cool spots.

This problem is particularly acute where the plenum chamber is one of large cross sectional area and of shallow depth. The problem would not be so pronounced if there were no limitations on the depth of the chamber. In commercial installations, however, space and weight limitations dictate that a large surface area accompanied by a small volumetric area of the burner be used in order to conserve space and reduce the weight that has to be suspended.

The present invention contemplates an improvement over the prior burner mentioned above in that the effective area of the generator may be increased without increasing the peripheral dimensions or weight. It also includes the provision of a more uniform dispersion of the gaseous mixture within the confines of a shallow plenum chamber. This provides a more uniform blanket of flame on the burner surface and the elimination of hot spots which cause quick deterioration of the screen. It also results in the elimination of unduly cool spots, as well as the hot spots, both of which fail to radiate rays within the desired range and the resultant loss of desired radiant energy.

The above, as well as other advantages of the invention, will become more apparent from the following description of some embodiments thereof which are illustrated by the accompanying drawings and forms a part of this specification.

In the drawings:

FIG. 2 is a side elevational view of the burner of FIG. 1;

FIG. 4 is a plan view of the interior of the plenum chamber, the burner and reverberator screens having been removed;

FIG. 5 is an end elevational view of the burner taken from the input end;

FIG. 6 is a section taken on the line 6—6 of FIG. 4;

FIG. 7 is a diagram showing a fragmentary section through the burner screen assembly taken on the line 7—7 of FIG. 1;

FIG. 8 is a plan view of a modified form of baffle useful in the invention;

FIGS. 9 and 10 are diagrammatic views of modifications of the burner screen;

FIGS. 11 and 12 are plan views on a reduced scale of other forms of burner screens; and FIG. 13 is an exploded fragmentary of an improved form of burner screen construction.

Figure 1:
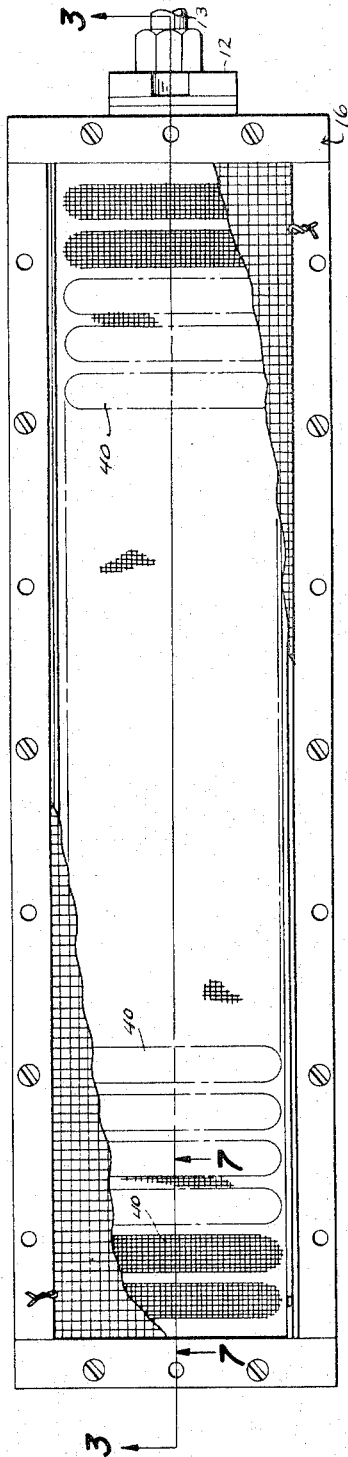
FIG. 1 is a plan view of an infrared ray generator with a portion of the reverberator screen broken away to show the improvement in the burner screen.
Figure 3:
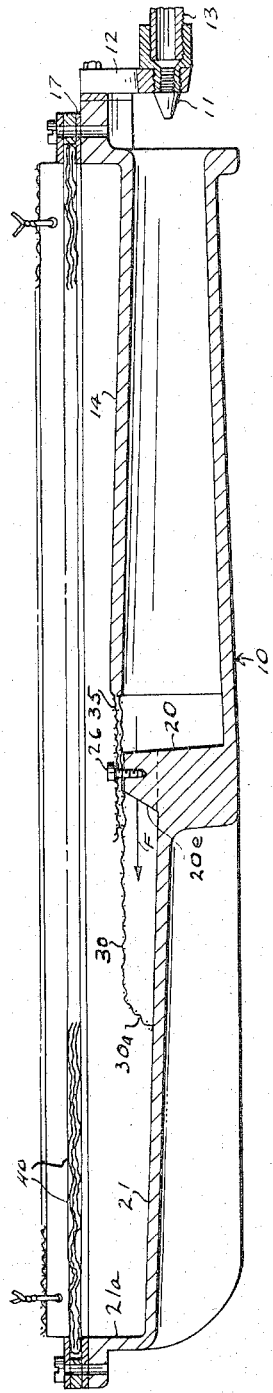
FIG. 3 is a sectional view taken on the line 3—3 of FIG. 1.

Referring now to the drawings, throughout which like parts are designated by like reference characters, as best shown in FIGS. 1 and 2, the generator comprises a housing 10 of generally rectangular plan and shallow depth which forms a plenum chamber. At one end is a gas admission orifice 11 supported by a bracket 12 from the end of the housing and connected by a conduit 13 to a source of gas, not shown, whereby gas or vaporized fuel may be admitted to the throat of a venturi 14 (FIG. 3). The upper end of the housing is formed with a peripheral flange 15 on which a burner screen assembly 16 is secured with the usual intervening gasket 17 between the screen frame and the flange 15.

As previously noted, one of the requirements for greatest efficiency in the generation of the infrared rays is the provision of a combustion surface where the burning of the fuel is an evenly distributed blanket of flame, and this in turn is determined by the ability to provide an even distribution of the fuel and pressure of the fuel under the burner screen.

As best shown in FIGS. 2 and 3, the fuel is admitted through the orifice 11 and passes into the venturi, air being induced in the opening at the venturi inlet and the air and fuel thus mixed in the venturi in a well known manner. Opposite the exit of the venturi there is provided a vertically extended wall 20. Beyond the wall 20 the bottom 21 of the chamber is at a higher level than the part where the venturi is located, to provide a shallow rectangular portion of the chamber beyond the wall 20. The bottom 21 has a slight incline whereby the depth of the shallow chamber decreases from the wall 20 to the extremity 21a.

The wall 20, facing toward the exit of the venturi, is provided with a pair of curved surfaces 20a, the outer edge of each merging with the side wall of the housing and the inner edges merging with each other to form a generally triangular divider portion 20b, the apex of which is opposite the center of the venturi exit opening. The purpose of the curved surfaces is to divert part of the fuel stream as it exits from the venturi and to turn it back on opposite sides of the venturi, as shown by the arrows G, into the deeper end of the plenum chamber. The bottom walls of this chamber on opposite sides of the venturi are provided with plane triangular surfaces 23 with the apexes being at the lowest level and starting at the bottom near the venturi exit and slanting upwardly toward the venturi inlet and of the casing causing the chamber to gradually decrease in depth toward the ends remote from the venturi outlet. Thus the back turned gases are deflected from the sides and upwardly in opposite directions to cause a more even distribution thereof, which even distribution is enhanced by the walls.

As can best be seen in FIG. 4, the portions of the walls 20 adjacent the sides and the apex 20b extend upward and at the top are provided with a flat triangular baffle support surface 20c where the curved walls merge with each other. Likewise the parts of the wall where they merge with the inner side walls of the casing extend upward and are provided with baffle support surfaces 20d. The surface 20c is provided with a threaded opening 25 for the reception of a screw 26 to hold the baffle in place.

On the far side of the venturi the wall parts slant down to the bottom wall 21, as indicated at 20e.

As can best be seen from FIG. 6, the vertically extending curved portions 20a intersect the downwardly slanting rear portions 20e and thus provide a pair of spaced rearwardly opening ports 20f which are disposed opposite to the top end of the venturi outlet, whereby certain amounts of gas, indicated by the arrows F, are directed along the bottom wall 21 and toward the end 21a of the chamber.

One of the particular improvements of the present invention is the utilization of baffle means disposed at the outlet of the venturi which cooperates with the structure, which was shown in the aforesaid patent, to prevent the "channeling" of the gas stream and to cause a greater dispersion thereof to provide an even fuel distribution and pressure throughout all points of the plenum chamber below the burner screen.

To this end the baffle consists basically of a foraminous member supported on the wall 20, wherein certain parts have greater resistance to upward fluid flow than others and certain other parts are interposed in the path of the fluid to cause a breaking up of the channeling stream and greater dispersion of the fuel.

A particularly economical form of baffle is shown in FIGS. 3 and 4 and comprises a 6-6 mesh Inconel screen 30 which is of generally rectangular form and is seated on the surfaces 20c and 20d. The screen is preferably wide enough to bridge the space between the side walls. The one end of the screen, toward the venturi outlet, extends to and contacts with the end of the venturi outlet near the top. The other end of the screen 30 extends beyond the wall 20 and is then bent downward at 30a at an angle of about 120° with the extremity in close proximity to or resting against the bottom wall 21.

On top of the screen 30 there is disposed a second 10-10 mesh screen 35 which may also be made of Inconel. This screen is of rectangular formation with one edge in contact with the outlet edge of the venturi and the opposite edge terminating at or just beyond the top of the slant wall parts 20e. The two screens are held in place by the screw 26 threaded through the screens into the opening 25.

The use of the wire screen provides the additional advantage that there are no sharp edges and thus provides a more evenly distributed laminar flow to the gas-air mixture than is obtained when there are sharp edges present.

It is thus apparent that this screen assembly provides a baffle means which provides a greater restriction on gas flow where the density is greatest as well as a dispersion thereof, this being above the points where the gas is turned backward by the curved surfaces 20a. It also assists in the backward turning of the gas accompanied by breaking up of the "channeling" which might occur. This eliminates "hot spots" on the burner screen directly above the areas between the end of the venturi and the wall 20.

The portions of 6-6 mesh screen beyond the wall 20 causes an initial disturbance of the two streams passing through the ports 20f and causes a dispersion of the gas above the baffle. Finally, the downwardly extending lip 30a breaks up the channeling of the two streams (arrows F) and causes a wide dispersion of the gas without unduly restricting the flow.

It is contemplated that the two screens 30 and 35 could be replaced by a single screen having a wide mesh at one end and a fine mesh at the other or that, as illustrated in FIG. 8, a single foraminous plate could be used wherein the end 30x, corresponding to the screen 30, would have large closely spaced holes and the other end 30y, corresponding to the place where the two screens are used, would have small holes to attain the same results.

As previously stated, one of the parameters which determines the B.t.u. of infrared generators is the area in square inches of the burner surface as defined by the perimeter lines of that surface. In the interest of economy of manufacture, it is highly desirable that the number of sizes of burners be reduced to a minimum. As explained, when a higher B.t.u. output is desired, it can be obtained by increasing the size, increasing the number of burners or by increasing the B.t.u. input which last is accompanied by a drop in efficiency.

I have found that the B.t.u. output in infrared radiant energy can also be raised by changing the shape of the burner screen surface from the usual flat surface to one having a plurality of ridges thereon without deleteriously effecting it.

One manner of effecting this is illustrated in FIGS. 1 and 7. In this instance, the surface of the screen is provided with a plurality of upwardly and transversely extending longitudinally spaced embossments 40. These embossments extend nearly across the burner surface but preferably terminate short of the edge of the assembly.

In making the embossments, the burner screen assembly is first assembled in the usual manner with the coarse mesh spreader screen 41 sandwiched between the burner screen 42 and the safety screen 43 and the longitudinal edges of the burner screen folded around and crimped around the other two screens usually the end portions are left uncrimped. This provides a flat rectangular screen assembly. It is then placed between a pair of dies and subjected to pressure to cause the embossments to be formed in all three parts simultaneously. Although several types of dies may be used, I have found that if a male die with half round bars is provided, and, the female die is comprised of a sheet of rubber and the screen is pressed between these two, the pressure of the male die forces the screen into and displaces the rubber to effect the forming without undue positional disturbance of the wires of the mesh, although some stretching may occur.

By causing the embossments to terminate short of the edge, the edge is left flat, although it may be slightly scalloped, whereby when disposed in the frame it can still expand and contract freely. It will be noted that the upwardly extending portions 40 are arcuate in cross sectional formation and are separated by substantially flat planar sections 44, although these last parts could be slightly curved, or they could both be curved, as shown diagrammatically at 44a in FIG. 9. It is also contemplated that the embossments could be contiguous to each other, as shown diagrammatically at 40a in FIG. 10.

The embossments could be longitudinally extending, as shown at 50 in FIG. 11, or they could be spaced semispherically embossments, as shown at 52 in FIG. 12. They could take other configurations than that shown. For instance, a trade name could be embossed in the screens and provide an effective increase in surface area. The design could also be diamond or waffle shaped.

In a screen of the proportions shown, I have found that the burner element parts will remain in the same position relative to each other without additional holding means. In cases where the burner is changed in configuration to provide a larger area, I contemplate that the elements could also be stitched together, preferably in the valleys, with metal stitching, or spot or seam welded, to provide additional means for holding the screens against separation.

In the various figures of the drawings the screens have been shown with the wires which form the mesh of each of the screens running in the same direction to each other, which is also at right angles and parallel to the longitudinal axis of the burner. Highly improved results are obtained, however, by causing the top screen to have the wires or strands which define the mesh running at oblique and obtuse angles, which may be 45° and 135° to the wires or strands of the other screens.

FIG. 13 is a fragmentary view wherein the coarse mesh screens 41 are disposed with the strands of the mesh extending at right angles and parallel to the longitudinal axis of the burner. The safety screen 43 is likewise disposed in the same manner. The burner screen 40a, in this instance, is disposed so that both the longitudinal wires and cross wires extend at angles of 45° and 135° to the wires of the other screens. In the figure it will be noted that the screen 42a is depicted with the bend line at 60 and the edge of this screen is folded over the edges of the other two screens and crimped to hold the two screens together, thus making an integral unit.

The screens after being assembled, which thus provide a unitary device with a fine safety screen on the bottom, a coarse spreader screen in the middle and a burner screen on top are a unit which can readily be replaced. After assembling in the manner described, the entire assembly may be distorted to provide any of the corrugations or dimples, as shown in FIGS. 1, 10 or 12, to increase the burner screen surface area.

The disposition of the burner screen so that the strands of the mesh run at 45° and 135° angles to the other screen, causes a greater dispersion of the combustible mixture as it passes through the screen and provides an even more uniform blanket of flame on the surface. It is not essential that the wires of the burner screen, which form the mesh, be disposed at exactly 45° and 135° angles to the wires of the spreader and safety screen since the angles may vary within wide limits and still give an improved dispersion. The greater dispersion, however, is realized when the 45° and 135° angles are maintained.

Although the drawings illustrate the strands of the burner screen as being disposed at an oblique and obtuse angle to those of the safety screen with the strands of the safety screen being in alignment with and normal to the longitudinal center line of the housing, it is apparent that the alignment of the strands of the safety and burner screen could be reversed with the strands of the safety screen having the angular disposition and those of the burner screen having longitudinal and normal alignment with the housing. Likewise, efficient results could be obtained by having both the safety and burner screen strands at such an angle that the angular relation of the strands in each screen to the other is oblique and obtuse angles, and the maximum efficiency at angles of 45° and 135° to each other.

The burner or top screen is usually of fine mesh with the spreader and separator screen of coarse mesh and with the safety screen also of fine mesh. The burner screen may be of finer mesh than the safety screen, particularly when the burner is used with natural gas. Thus the size of the mesh in the safety screen may be varied for different type of gases.

The transverse embossments, as illustrated in FIG. 1, are particularly efficacious because on a burner of rectangular shape, when the burner screen heats it has the greatest expansion longitudinally. By running the embossment transversely this expansion does not have a deleterious effect because the corrugations provide for more flexibility of the screen longitudinally. Although longitudinal corrugations may be used these have a tendency to stiffen the screen structure in a longitudinal direction which upon heating causes a buckling effect. The distortion of the screens after the preliminary assembly increases or tightens the body contact between the screens and the stitching or spot welding in the valleys further tighten this body contact.

The burner has been described and illustrated as having the burner screen on top of the housing. In actual use, however, it is common to turn the burners from the position shown in the drawings so that the burner screen faces downward or sidewise.

Having thus described the invention in some embodiments thereof, I am aware that numerous and extensive departures may be made therefrom without departing from the spirit or scope of the invention as defined by the appended claims.

I claim:

1. A burner of the class described including a housing forming a plenum chamber and having side walls defining an open side with a burner assembly covering the open side, means for distributing a combustible gaseous mixture with equal pressure and equal mixing to all points of the assembly comprising a first plenum portion having a venturi mixing tube extending longitudinally therein, a wall extending across said chamber and having a first surface on one side and a pair of curved diverting surfaces on the other side disposed opposite the lower portion of the exit of the venturi tube and intersecting said first surface for turning back said mixture and extending from the bottom of said chamber to a point spaced from the top, a second portion of said plenum chamber having a bottom spaced above the bottom of said first portion and extending from said wall to the end of the housing, a pair of ports defined by said curved surfaces where they intersect the first surface disposed opposite to the top of the outlet from the venturi and leading to the said second portion of the plenum chamber, a gas distribution and baffle means disposed over said curved surfaces and ports and extending in a first direction between a pair of opposite sidewalls into close proximity with the exit of said venturi and in the opposite direction over said second chamber portion spaced from the bottom and having an end portion extending downward into close proximity with said bottom.

2. A burner of the class described including a housing forming a plenum chamber and having side walls defining an open side with a burner assembly covering the open side, means for distributing a combustible gaseous mixture with equal pressure and equal mixing to all points of the assembly comprising a first plenum portion having a venturi mixing tube extending longitudinally therein, a wall extending across said chamber in front of the exit of said venturi tube, said wall having a slanting surface on the far side from said exit and a pair of curved diverting surfaces on the other side disposed on opposite sides of the lower portion of the exit of the venturi tube, said curved surfaces intersecting said slanting surface and extending from the bottom of said chamber to a point spaced from the top for turning back a portion of said mixture, a second portion of said plenum chamber having a bottom spaced above the bottom of said first portion and extending from said wall to the end of the housing, a pair of ports defined by said curved surfaces where they intersect said slanting surfaces disposed opposite to the top of the outlet from the venturi and leading to the said second portion of the plenum chamber, a gas distribution and baffle means disposed over said curved surfaces and ports and extending in a first direction between a pair of opposite side walls into close proximity with the exit of said venturi and in the opposite direction over said second chamber portion and spaced from the bottom thereof, and having an end portion extending downward into contact with said bottom, said baffle means being a foraminous member formed to provide greater resistance to the passage of the mixture in the zone between the curved surfaces and the venturi and less resistance in that portion extending into the second portion of said chamber.

3. The device described in claim 2, wherein said burner assembly covering the open side comprises a spreader screen of coarse mesh, a safety screen of fine mesh on one side of the spreader screen, and a burner screen of fine mesh on the other side of the spreader screen, all of the screens being in close contact with one another and providing a generally elongated rectangular surface and said screens being embossed and providing a burner including a plurality of ridges.

4. The device as described in claim 3, wherein the said ridges extend transversely of said elongated rectangular surface.

5. The device as described in claim 4, wherein the strands of said safety screen and the strands of said burner screen at 45° and 130° angles to one another.

6. A burner of the class described including a housing forming a plenum chamber and having side walls defining an open side with a burner assembly covering the open side means for distributing a combustible gaseous mixture with equal pressure and equal mixing to all points of the assembly comprising a first plenum portion having a venturi mixing tube extending longitudinally therein, a wall extending across said chamber in front of the exit of said venturi tube, said wall having a slanting surface on the far side from said exit and a pair of curved diverting surfaces on the other side disposed on opposite sides of the lower portion of the exit of the venturi tube, said curved surfaces intersecting said slanting surface and extending from the bottom of said chamber to a point spaced from the top for turning back a portion of said mixture, a second portion of said plenum chamber having a bottom spaced above the bottom of said first portion and extending from said wall to the end of the housing, a pair of ports defined by said curved surfaces where they intersect said slanting surfaces disposed opposite to the top of the outlet from the venturi and leading to the said second portion of the plenum chamber, a gas distribution and baffle means disposed over said curved surfaces and ports and extending in a first direction between a pair of opposite side walls into close proximity with the exit of said venturi and in the opposite direction over said second chamber portion and spaced from the bottom thereof, and having an end portion extending downward into contact with said bottom, said baffle member comprised of a first coarse mesh screen extending from the venturi outlet into the second chamber and a fine mesh screen disposed juxtaposed to the coarse mesh screen and extending from the venturi outlet to a position slightly beyond said curved surfaces, thereby providing a greater resistance to the passage of the mixture in the zone between the curved surfaces and the venturi and less resistance in that portion extending into the second portion of said chamber.

7. A unit burner surface for an infrared ray generator to be placed over the opening in a housing comprising a spreader screen of coarse mesh, a safety screen in contact with the spreader screen on the housing side thereof, a burner screen of fine mesh disposed in contact with the spreader screen on the opposite side, said fine mesh screens being arranged whereby the strands of the screens extend at oblique and obtuse angles to each other.

8. A device as described in claim 7, wherein the strands of one screen extend at 45° and 135° angles to the strands of the other screen.

9. The device of claim 7, wherein said screens are deformed to increase their surface area.

10. The device of claim 7, wherein said screens are embossed to provide a burner surface with a plurality of ridges.

11. The device of claim 10, wherein said ridges extend transversely of the generator.

References Cited

UNITED STATES PATENTS

| | | | |
|---|---|---|---|
| 993,554 | 5/1911 | Sanford | 158—112 |
| 2,607,663 | 8/1952 | Perry et al. | |
| 3,029,866 | 5/1962 | Honger et al. | 158—114 |
| 3,084,736 | 4/1963 | Mentel et al. | 158—114 |
| 3,122,197 | 2/1964 | Saponara et al. | |

FOREIGN PATENTS

| | | |
|---|---|---|
| 1,129,123 | 9/1956 | France. |
| 893,554 | 2/1962 | Great Britain. |

FREDERICK L. MATTESON, JR., *Primary Examiner.*

H. B. RAMEY, *Assistant Examiner.*